United States Patent
Kamaga

(10) Patent No.: US 7,791,217 B2
(45) Date of Patent: Sep. 7, 2010

(54) ELECTRIC-POWERED VEHICLE CHARGEABLE BY EXTERNAL POWER SUPPLY

(75) Inventor: Ryuichi Kamaga, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 111 days.

(21) Appl. No.: 12/230,675

(22) Filed: Sep. 3, 2008

(65) Prior Publication Data

US 2009/0057041 A1    Mar. 5, 2009

(30) Foreign Application Priority Data

Sep. 4, 2007   (JP) ............... 2007-228818

(51) Int. Cl.
*B60K 1/00*   (2006.01)
(52) U.S. Cl. .................... 307/9.1; 307/10.1
(58) Field of Classification Search ........ 307/9.1, 307/10.1
See application file for complete search history.

(56) References Cited

U.S. PATENT DOCUMENTS 5,677,604 A * 10/1997 Masaki et al. ............ 318/139

FOREIGN PATENT DOCUMENTS

| EP | 0536056 A1 * | 9/1992 |
|---|---|---|
| JP | U 1-105301 | 7/1989 |
| JP | A-5-95607 | 4/1993 |
| JP | A 7-39012 | 2/1995 |
| JP | A 7-115710 | 5/1995 |
| JP | A 9-154236 | 6/1997 |
| JP | A 9-322313 | 12/1997 |
| JP | A 2006-311640 | 11/2006 |

* cited by examiner

*Primary Examiner*—Fritz M Fleming
(74) *Attorney, Agent, or Firm*—Oliff & Berridge, PLC

(57) ABSTRACT

An open/close detection unit detects whether a lid covering a charge connector is closed or opened, and outputs the result of detection to a vehicle control unit. A connection detection unit receives a first signal and detects whether a plug and the charge connector are connected or not based on the voltage of the first signal. The vehicle control unit determines, based on the result of detection by the connection detection unit and information about an external power supply indicated by a second signal, whether the first signal is normal. When the first signal is abnormal, the vehicle control unit determines, based on the result of detection by the open/close detection unit, whether the lid is closed. When the lid is closed, the vehicle control unit controls the vehicle state to be in the travel-enabled state.

8 Claims, 11 Drawing Sheets

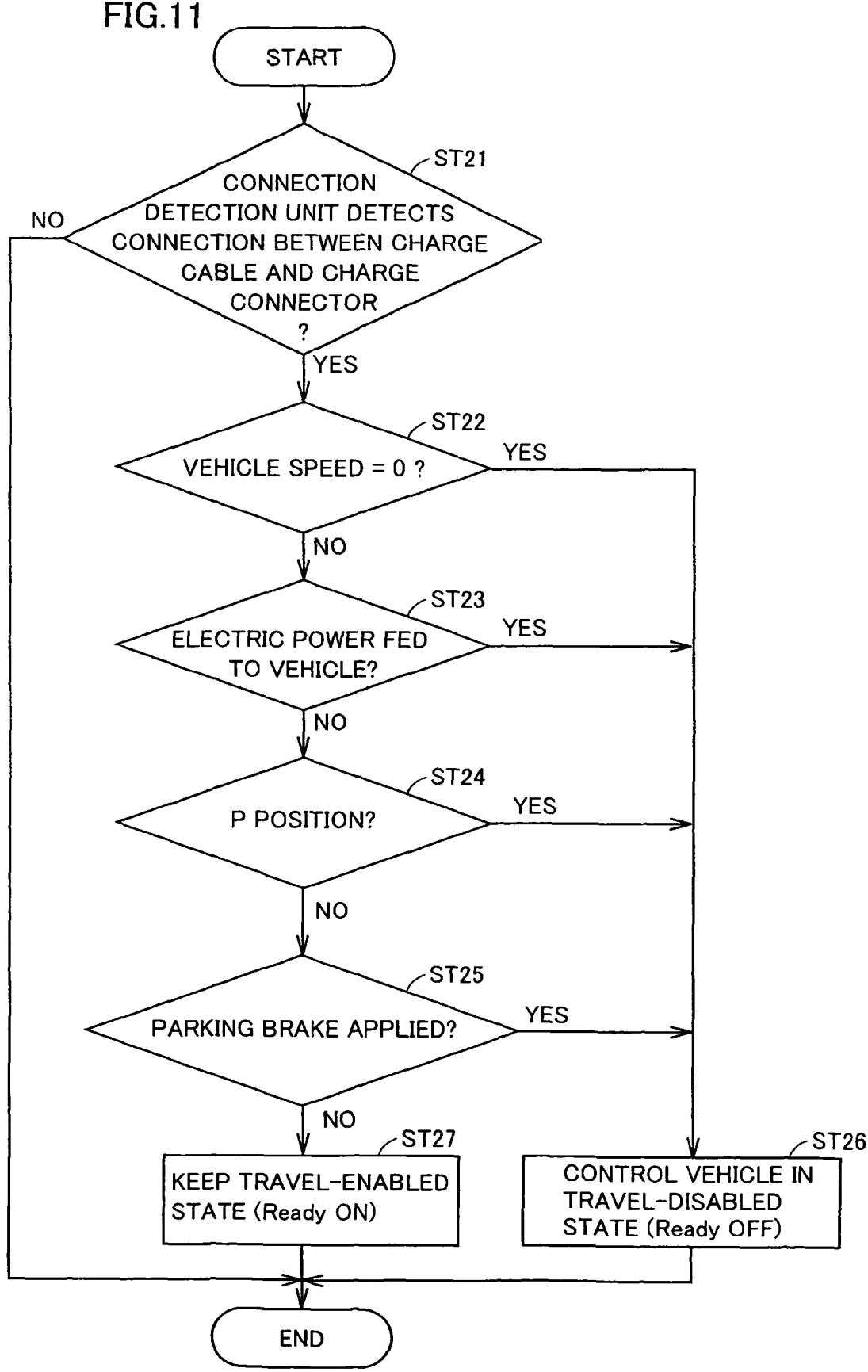

ated driving force for the electric-powered vehicle; a charge
ELECTRIC-POWERED VEHICLE CHARGEABLE BY EXTERNAL POWER SUPPLY This nonprofessional application is based on Japanese Patent Application No. 2007-228818 filed on Sep. 4, 2007 with the Japan Patent Office, the entire contents of which are hereby incorporated by reference.

BACKGROUND OF THE INVENTION

1. Field of the Invention

The present invention relates to an electric-powered vehicle, and particularly to an electric-powered vehicle chargeable by an external power supply.

2. Description of the Background Art

An electric-powered vehicle is mounted with a power storage device (such as secondary battery or capacitor for example) and travels by using driving force generated from electric power stored in the power storage device. The electric-powered vehicle includes, for example, electric vehicle, hybrid vehicle and fuel-cell vehicle.

In recent years, a technique has been proposed for charging a power storage device mounted on such electric-powered vehicles as described above by a commercial power supply having a high power generation efficiency. With this technique, increase in fuel consumption efficiency of the hybrid vehicle for example can be expected. In particular, attention is given to a technique for charging a power storage device mounted on an electric-powered vehicle by a commercial power supply providing electric power to each household (a power source of a relatively low voltage such as 100 V or 200 V, for example).

When a power storage device mounted on a vehicle is charged, generally a plug of a charge cable is connected to a connector provided to the vehicle. If the vehicle travels while the plug of the charge cable is still connected to the connector, various problems such as damage to the charge cable could occur.

Japanese Utility Model Laying-Open No. 1-105301 for example discloses a vehicle including a device for detecting that a battery is being charged. When it is detected that supply of electric power to a travel control circuit is started and it is detected that the battery is being charged, the vehicle is disabled from traveling.

Japanese Utility Model Laying-Open No. 1-105301 discloses that the device for detecting that the battery is being charged is a switch that is turned on when a connector of a charger and a connector used for supplying the electric power from an external power supply are connected. There is a possibility, however, that the switch fails. If the switch cannot be turned off, the vehicle is unable to travel regardless of the fact that the vehicle is not being charged. Accordingly, the convenience of the user could be deteriorated. Japanese Utility Model Laying-Open No. 1-105301, however, does not disclose a specific method for avoiding the problem that the user cannot use the vehicle due to a malfunction of a detection system used for detecting the state of connection of the connector provided to the vehicle.

SUMMARY OF THE INVENTION

An object of the present invention is to provide an electric-powered vehicle that is enabled to travel, when the vehicle satisfies a predetermined condition, even if an abnormality occurs to a detection system used for detecting electrical connection between the electric-powered vehicle and an external power supply.

In summary, the present invention according to one aspect is an electric-powered vehicle chargeable by an external power supply. The electric-powered vehicle includes: a power storage device storing electric power used for generating driving force for the electric-powered vehicle; a charge connector used for connecting, to the electric-powered vehicle, a cable transmitting electric power from the external power supply to charge the power storage device; a lid configured to be opened and closed, and cover the charge connector when the lid is in a closed state; a first detection unit detecting whether or not the charge connector and the cable are connected to each other; a second detection unit detecting whether the lid is in the closed state or an opened state; and a vehicle control unit controlling the electric-powered vehicle into a travel-enabled state when the first detection unit detects that the charge connector and the cable are disconnected from each other and the second detection unit detects the closed state of the lid. In a case where result of detection by the first detection unit is abnormal, the vehicle control unit controls the electric-powered vehicle into the travel-enabled state when the second detection unit detects the closed state of the lid.

Preferably, the electric-powered vehicle further includes a notification unit giving notification that the result of detection by the first detection unit is abnormal, in response to a notification instruction from the vehicle control unit.

More preferably, the vehicle control unit sends the notification instruction to the notification unit in response to an instruction to activate the vehicle, in the case where the result of detection by the first detection unit is abnormal.

Preferably, the vehicle control unit controls the electric-powered vehicle into a travel-disabled state in a case where the result of detection by the first detection unit is normal, where the first detection unit detects that the charge connector and the cable are connected to each other and where the second detection unit detects the opened state of the lid.

Preferably, the vehicle control unit controls the electric-powered vehicle into a travel-disabled state in the case where the result of detection by the first detection unit is abnormal and the second detection unit detects the opened state of the lid.

The present invention according to another aspect is an electric-powered vehicle chargeable by an external power supply, including: a power storage device storing electric power used for generating driving force for the electric-powered vehicle; a charge connector used for connecting, to the electric-powered vehicle, a cable transmitting electric power from the external power supply to charge the power storage device; a lid configured to be opened and closed, and cover the charge connector when the lid is in a closed state; a closed state keeping unit keeping the lid in the closed state; a first detection unit detecting whether or not the charge connector and the cable are connected to each other; and a vehicle control unit controlling the electric-powered vehicle into a travel-enabled state when the first detection unit detects that the charge connector and the cable are disconnected from each other and the closed state keeping unit keeps the lid in the closed state. The vehicle control unit controls, in a case where result of detection by the first detection unit is abnormal, the electric-powered vehicle into the travel-enabled state when the closed state keeping unit keeps the lid in the closed state.

Preferably, the electric-powered vehicle further includes a second detection unit detecting whether the lid is in the closed state or an opened state. The vehicle control unit controls the electric-powered vehicle into a travel-disabled state in a case where the result of detection by the first detection unit is normal, where the first detection unit detects that the charge connector and the cable are connected to each other and where the second detection unit detects the opened state of the lid.

More preferably, the vehicle control unit controls the electric-powered vehicle into the travel-disabled state in the case where the result of detection by the first detection unit is abnormal and the second detection unit detects the opened state of the lid.

The present invention according to still another aspect is an electric-powered vehicle connectable to an external power supply via a connection device and chargeable by the external power supply, including: a power storage device storing electric power used for generating driving force for the electric-powered vehicle; a charge connector used for connecting the connection device to the electric-powered vehicle to charge the power storage device; a connection detection unit detecting whether or not the charge connector and the connection device are connected to each other; and a vehicle control unit controlling the electric-powered vehicle into a travel-disabled state in a case where the connection detection unit detects that the charge connector and the connection device are connected to each other and a predetermined condition is satisfied. The vehicle control unit controls the electric-powered vehicle into a travel-enabled state in a case where the connection detection unit detects that the charge connector and the connection device are connected to each other and the predetermined condition is not satisfied.

Preferably, the electric-powered vehicle further includes: a parking brake; and a shift device selecting a corresponding shift position from a plurality of shift positions including a parking position, according to a shift operation by a driver of the electric-powered vehicle. The connection device outputs to the electric-powered vehicle information about the external power supply, when the connection device is connected to the external power supply. The predetermined condition is at least one of a condition that speed of the electric-powered vehicle is zero, a condition that the vehicle control unit receives from the connection device the information about the external power supply, a condition that the parking brake is applied, and a condition that the corresponding shift position is the parking position.

As seen from the above, in accordance with the present invention, the electric-powered vehicle is allowed to be in the travel-enabled state even when an abnormality occurs to the detection system used for detecting electrical connection between the electric-powered vehicle and the external power supply. Accordingly, influence on the convenience of the user can be lessened.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart illustrating a process for controlling the state of a vehicle 100A that is performed by a vehicle control unit 63A.

DESCRIPTION OF THE PREFERRED EMBODIMENTS

Figure 1:
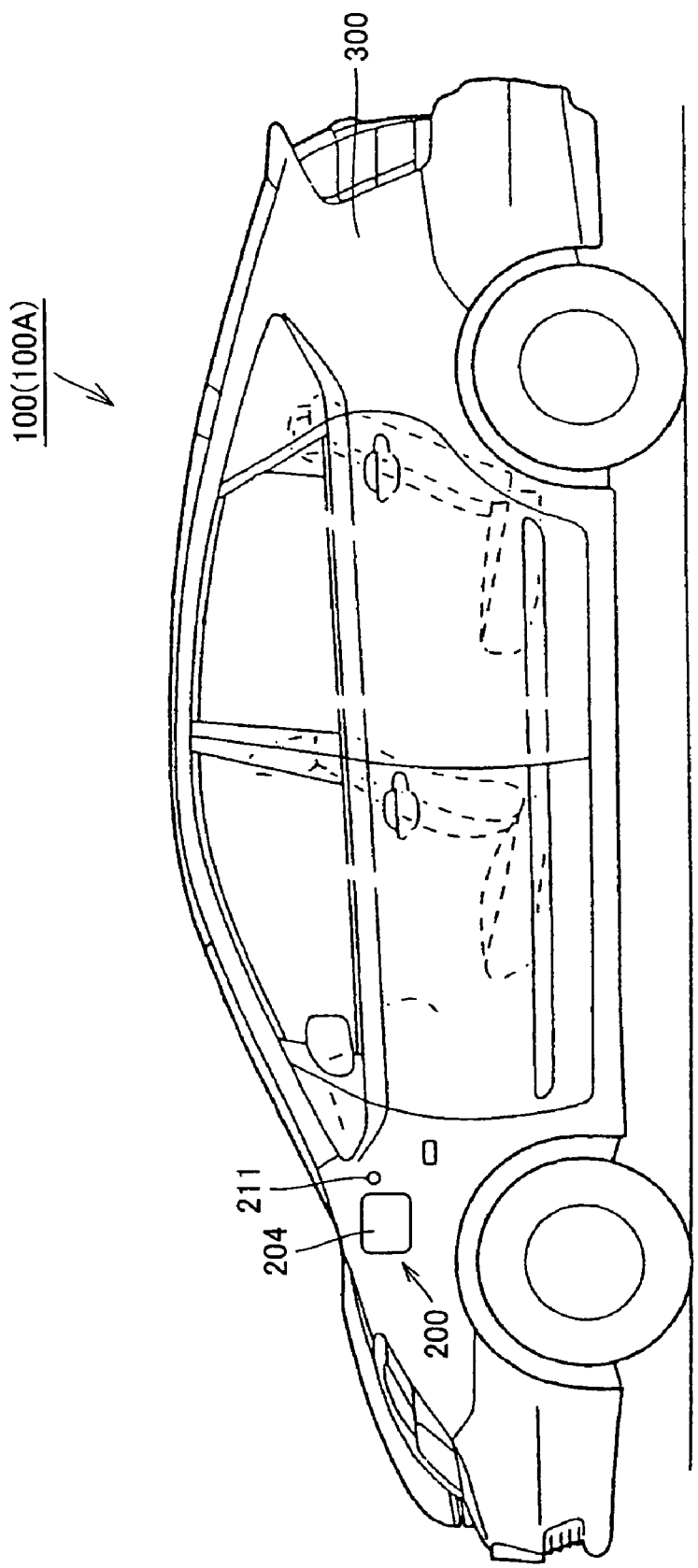
FIG. 1 is a side view of a vehicle 100 according to an embodiment of the present invention.

In the following, embodiments of the present invention will be described in detail with reference to the drawings. In the drawings, like or corresponding components are denoted by like reference characters, and a description thereof will not be repeated.

In the embodiments of the present invention, an electric-powered vehicle chargeable by an external power supply refers to a hybrid vehicle. The electric-powered vehicle chargeable by an external power supply, however, is not limited to the hybrid vehicle and may be an electric vehicle for example.

First Embodiment

A vehicle 100 according to an embodiment of the present invention is mounted with an internal combustion engine (engine), a power storage device and an electric motor that is rotatably driven by electric power from the power storage device, and achieves a high fuel consumption efficiency by optimally distributing driving force generated by the internal combustion engine and that generated by the electric motor. Further, the power storage device mounted on vehicle 100 is chargeable with electric power from an external power supply (commercial power supply for example).

FIG. 1 is a side view of vehicle 100 according to the embodiment of the present invention. Referring to FIG. 1, a charge port 200 is formed in a vehicle body (body) 300. Charge port 200 is provided with a connector (not shown in FIG. 1) connected to a cable which is used for transmitting electric power supplied from a commercial power supply as well as a lid 204 for preventing water, dust particles and the like from entering the connector. FIG. 1 shows a structure where charge port 200 is formed on the left side and the front-wheel side of vehicle body 300. The position where charge port 200 is formed, however, is not limited to a particular one.

In the vicinity of charge port 200, a lamp 211 is provided. Lamp 211 is turned on when charging of the power storage device is started and is turned off when the charging is completed.

In the body of vehicle 100 according to the present embodiment, a fuel filler neck (not shown) for supplying fuel which is necessary for operating the internal combustion engine is formed.

Figure 2:
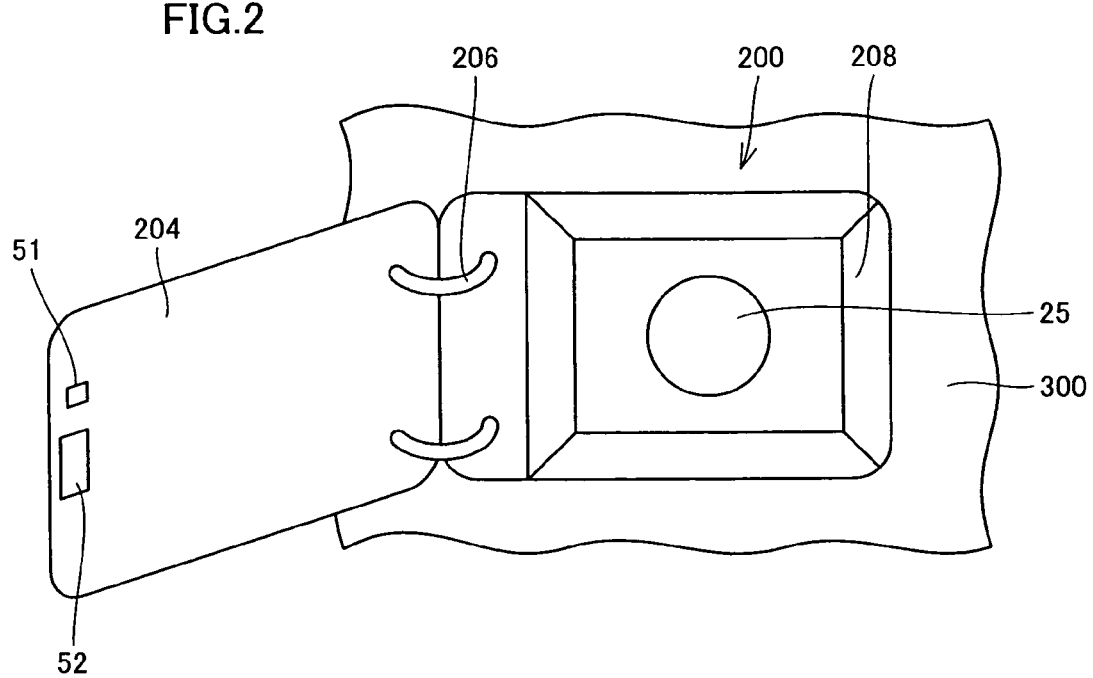
FIG. 2 is an external view of a charge port 200.

FIG. 2 is an external view of charge port 200. FIG. 2 shows the state where lid 204 is opened.

Referring to FIG. 2, charge port 200 includes a housing 208 that is a depressed portion formed in the vehicle's external surface of body 300. Housing 208 houses a charge connector 25.

Lid 204 is pivotably supported by a support 206. A user can thus open and close lid 204. A switch 51 is provided to lid 204 for detecting the opened state and the closed state of lid 204. A lock 52 is also provided to lid 204 to keep lid 204 in the closed state (namely to lock).

Figure 3:
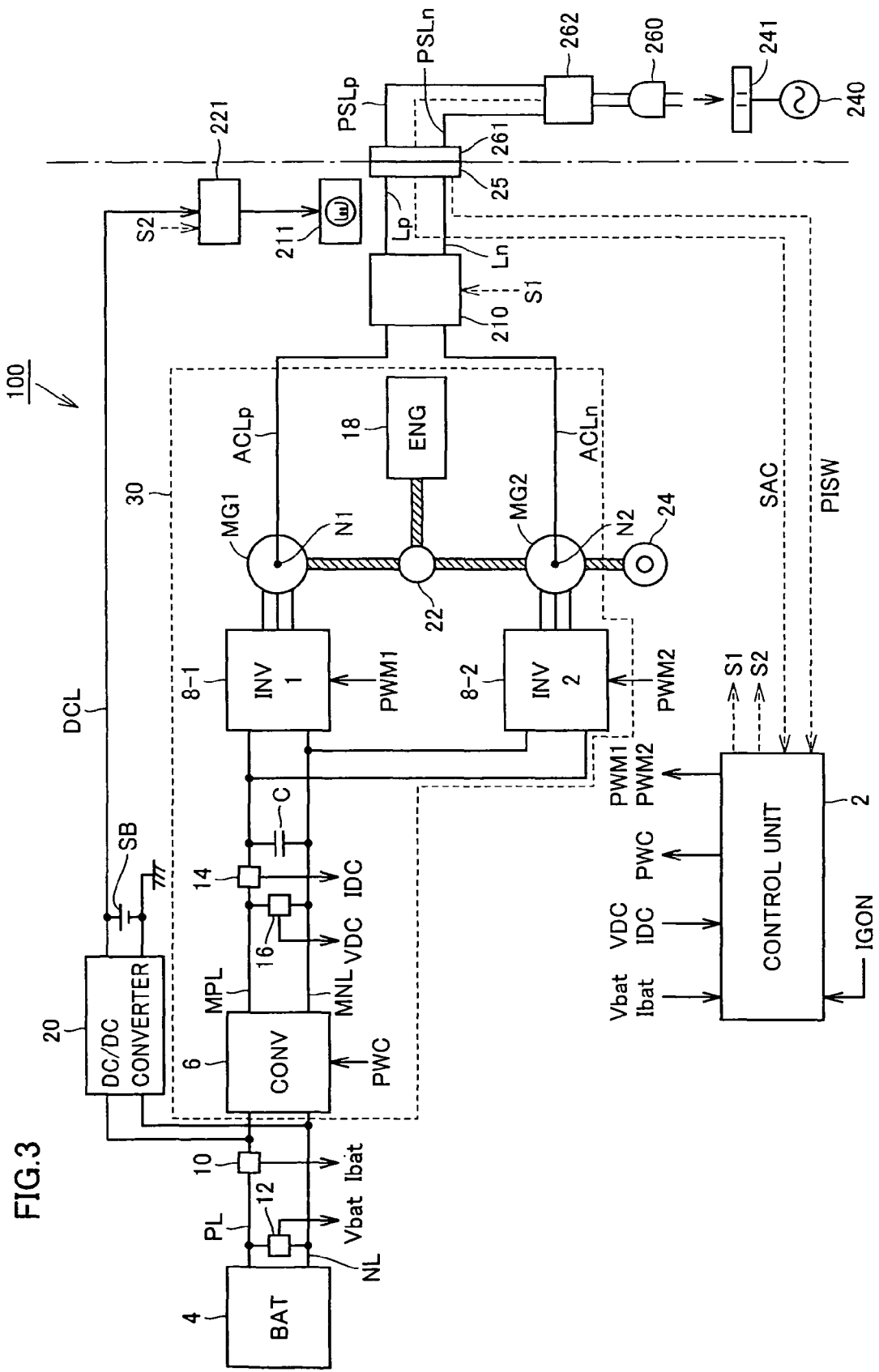
FIG. 3 is a schematic configuration diagram of vehicle 100.
Figure 4:
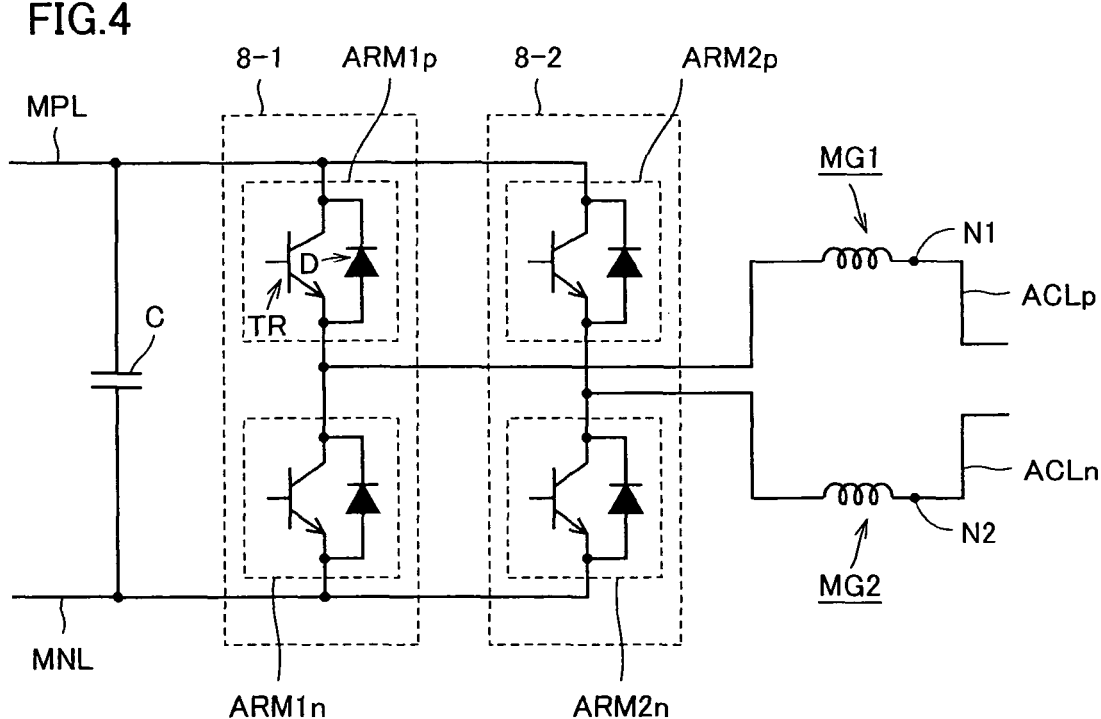
FIG. 4 shows a zero-phase equivalent circuit of inverters 8-1, 8-2 and motor generators MG1, MG2 in a zero-phase mode.

Referring further to FIGS. 3 and 4, a configuration of vehicle 100 will be described in more detail.

FIG. 3 is a schematic configuration diagram of vehicle 100. Referring to FIG. 3, vehicle 100 is a parallel/series hybrid vehicle.

Vehicle 100 includes a control unit 2 for controlling operation of vehicle 100, a power storage device (BAT) 4 storing electric power for generating driving force for vehicle 100, and a drive device 30 that can drive vehicle 100 by using the electric power stored in power storage device 4. Drive device 30 includes a converter (CONV) 6, a main positive line MPL, a main negative line MNL, a capacitor C, a first inverter (INV1) 8-1, a second inverter (INV2) 8-2, a motor generator MG1, a motor generator MG2, an internal combustion engine ENG, and a power split device 22.

Power storage device 4 is an electric power storage element that is configured to be chargeable and dischargeable. Power storage device 4 is formed, for example, of a secondary battery such as lithium-ion battery or nickel-hydrogen battery, or a power storage element such as electric double layer capacitor.

Converter 6 makes an interconversion between the input/output voltage of power storage device 4 and the voltage between main positive line MPL and main negative line MNL. The voltage conversion by converter 6 is controlled according to switching command PWC from control unit 2.

Capacitor C smoothes the voltage between main positive line MPL and main negative line MNL. Inverters 8-1, 8-2 are provided in association with motor generators MG1, MG2 respectively. Inverters 8-1, 8-2 are electrically connected, in parallel with each other, to power storage device 4. Inverters 8-1, 8-2 make an interconversion between DC power and AC power.

Vehicle 100 further includes charge connector 25, an AC port 210 and electric power lines Lp, Ln, ACLp, ACLn.

AC port 210 electrically connects electric power line Lp and electric power line ACLp and further electrically connects electric power line Ln and electric power line ACLn, in response to signal S1. Control unit 2 generates signal S1 for controlling the electrical connection between electric power line Lp and electric power line ACLp as well as the electrical connection between electric power line Ln and electric power line ACLn, and outputs the signal to AC port 210.

AC port 210 is connected by electric power lines Lp, Ln to charge connector 25. AC port 210 is further connected by electric power lines ACLp and ACLn to a neutral point N1 of motor generator MG1 and a neutral point N2 of motor generator MG2.

Motor generators MG1 and MG2 each include a stator having a U phase coil, a V phase coil and a W phase coil that are Y-connected (star-connected). The point where the Y-connected three coils of each motor generator are commonly connected corresponds to neutral point N1 of motor generator MG1 or neutral point N2 of motor generator MG2.

In the case where power storage device 4 is charged by external power supply 240, the electric power from external power supply 240 is transmitted through the charge cable to vehicle 100. The charge cable includes electric power lines PSLp, PSLn and plugs 260, 261.

Plug 260 is connected to a connector 241 that is electrically coupled to external power supply 240. Plug 261 is connected to charge connector 25. Accordingly, electric power lines PSLp, Lp, ACLp are electrically connected and electric power lines PSLn, Ln, ACLn are electrically connected.

Control unit 2 receives signal PISW indicating that plug 261 and charge connector 25 are connected. Based on the voltage level of signal PISW, control unit 2 detects that plug 261 is connected to charge connector 25.

Here, the voltage value and the type (DC or AC) of the electric power supplied from external power supply 240 are not limited to particular ones. For example, a commercial power supply providing electric power to each household may be used as external power supply 240. In the present embodiment, external power supply 240 is a commercial single-phase AC power supply (with its voltage value of 100 V or 200 V).

A charging control device 262 outputs signal SAC including information about the voltage value of the electric power supplied from external power supply 240, the electric current capacity of the external power supply, and the like. Control unit 2 receives signal SAC. Based on the information included in signal SAC, control unit 2 detects that electric power is supplied from external power supply 240.

Signals PISW, SAC are sent from charging control device 262 to control unit 2, through a signal line (not shown) in the charge cable and a signal line (not shown) provided between charge connector 25 and control unit 2.

The electric power of the external power supply is supplied to neutral points N1, N2 of motor generators MG1, MG2, and accordingly the voltage of electric power line PSLp is applied to each phase on the AC side of inverter 8-1, and the voltage of electric power line PSLn is applied to each phase on the AC side of inverter 8-2. In response to respective switching commands PWM1, PWM2, inverters 8-1, 8-2 perform switching operation. Thus, DC electric power having a predetermined voltage value is supplied from inverters 8-1, 8-2 to main positive line MPL and main negative line MNL.

More specifically, inverters 8-1, 8-2 each include three arm circuits corresponding respectively to three phases on the AC side. Each arm circuit includes an upper arm circuit and a lower arm circuit each having at least one switching element.

In inverters 8-1, 8-2 each, the upper arm circuits corresponding to respective phases are all turned on/off together, and the lower arm circuits corresponding to respective phases are also all turned on/off together. Thus, in inverters 8-1, 8-2 each, the three upper arm circuits can be regarded as being in the same switching state (all of the circuits are on or off). Similarly, the three lower arm circuits can be regarded as being in the same switching state. By this switching operation, respective phase voltages can be made equal to each other. Here, such a switching mode is also referred to as zero-phase mode.

FIG. 4 shows a zero-phase equivalent circuit of inverters 8-1, 8-2 and motor generators MG1, MG2 in the zero-phase mode. Referring to FIG. 4, in the case where inverters 8-1, 8-2 perform the switching operation according to the above-described zero-phase mode, the three upper arm circuits of inverter 8-1 may be collectively represented as upper arm ARM1$p$, and the three lower arm circuits of inverter 8-1 may be collectively represented as lower arm ARM1$n$. Upper arm ARM1$p$ and lower arm ARM1$n$ are each formed of a switching element TR and a free-wheeling diode D. Similarly, the three upper arm circuits of inverter 8-2 may be collectively represented as upper arm ARM2p and the three lower arm circuits of inverter 8-2 may be collectively represented as lower arm ARM2n.

The zero-phase equivalent circuit shown in FIG. 4 can be regarded as a single phase inverter that can convert the DC power supplied through main positive line MPL and main negative line MNL into single-phase AC power, and convert single-phase AC power that is input to neutral points N1 and N2 through electric power lines ACLp, ACLn into DC power.

Specifically, inverters 8-1, 8-2 are controlled so that the zero-phase mode can be implemented, and accordingly inverters 8-1, 8-2 can be operated equivalently as single-phase inverters. Thus, the single-phase AC power supplied from external power supply 240 can be converted into the DC power, and this DC power can be supplied to main positive line MPL and main negative line MNL. The DC power is used to charge power storage device 4.

Referring again to FIG. 3, the configuration of vehicle 100 will be further described. Internal combustion engine ENG is operated through combustion of fuel. Motor generator MG1 can generate electric power by receiving a part of the motive power from internal combustion engine ENG. Motor generator MG2 operates as an electric motor using the electric power from power storage device (BAT) 4.

Internal combustion engine ENG and motor generators MG1, MG2 are mechanically coupled to each other via power split device 22. Power split device 22 is typically formed of a planetary gear train.

When vehicle 100 is traveling, inverter 8-1 mainly converts the AC power generated by motor generator MG1 into DC power in response to switching command PWM1 from control unit 2. Inverter 8-2 converts, in response to switching command PWM2 from control unit 2, the DC power supplied through main positive line MPL and main negative line MNL into AC power and supplies the AC power to motor generator MG2. Power split device 22 splits the driving force generated by the operation of internal combustion engine ENG into two components and delivers the one to motor generator MG1 and the other to motor generator MG2.

The driving force delivered from power split device 22 to motor generator MG1 is used for generating electric power. The electric power generated by motor generator MG1 is used for charging power storage device 4, or used for generating driving force by motor generator MG2. The driving force delivered to motor generator MG2 is combined with driving force generated by motor generator MG2 to be used for driving drive wheels 24.

Here, the number of power storage devices and the capacity of the power storage device are not limited to particular ones. For example, a plurality of power storage devices may be mounted on vehicle 100. Thus, in the case where power storage devices 4 are charged by external power supply 240, power storage devices 4 can be sufficiently charged. In this case, the vehicle can travel by using only the driving force generated by motor generator MG2 while keeping internal combustion engine ENG in the stopped state, namely the vehicle can travel in the so-called EV (Electric vehicle) mode. For example, a larger quantity of electric power can be stored by increasing the number of power storage devices, for example, so that the vehicle can travel over a longer distance in the EV mode.

Control unit 2 is, for example, an ECU (Electronic Control Unit) including a CPU (Central Processing Unit), a RAM (Random Access Memory), a ROM (Read Only Memory) and an input/output interface unit.

Control unit 2 controls converter 6 and inverters 8-1, 8-2 based on information from current sensors 10, 14 and voltage sensors 12, 16. Current sensor 10 detects current Ibat that is electric current flowing through electric power line PL (electric current input/output to/from power storage device 4). Voltage sensor 12 detects voltage Vbat between electric power lines PL and NL. Current sensor 14 detects current IDC flowing through main positive line MPL. Voltage sensor 16 detects voltage VDC between main positive line MPL and main negative line MNL. Control unit 2 receives respective values of current Ibat and current IDC and respective values of voltage Vbat and voltage VDC and outputs switching commands PWM1, PWM2, PWC.

Control unit 2 further controls internal combustion engine ENG. Receiving activation instruction IGON that is an instruction to activate vehicle 100 so that the vehicle is ready to travel, control unit 2 performs a process for starting internal combustion engine ENG and motor generators MG1, MG2.

Vehicle 100 further includes a DC/DC converter 20, an auxiliary battery SB, a lamp 211, and a drive device 221. DC/DC converter 20 is electrically connected to power storage device 4, in parallel with converter 6. DC/DC converter 20 steps down the electric power discharged from power storage device 4 to generate auxiliary electric power. The voltage of the auxiliary electric power is set to a voltage (12 V or 24 V for example) lower than the charging/discharging voltage (288 V for example) of the power storage device.

The auxiliary electric power generated by DC/DC converter 20 is supplied through electric power line DCL to various auxiliary components (not shown) of vehicle 100, and a part thereof is supplied to an auxiliary battery SB. Auxiliary battery SB stores the auxiliary electric power.

Because of the presence of auxiliary battery SB, each auxiliary component can be supplied with the auxiliary electric power even when vehicle 100 is in inactive state (ignition off state). The electric power stored in auxiliary battery SB is supplied for example to control unit 2 and drive device 221.

Auxiliary battery SB is charged, for example, by external power supply 240, together with power storage device 4. While power storage device 4 is being charged, for example, DC/DC converter 20 can be operated to charge power storage device 4 and auxiliary battery SB.

Lamp 211 is for example LED (light emitting diode). LED can be used for lamp 211 to reduce the power consumption. Further, since LED emits light with relatively high directivity, the user can easily determine whether or not lamp 211 is turned on. Namely, the user can easily determine whether power storage device 4 is being charged or not, even at some distance from vehicle 100.

Drive device 221 drives lamp 211 in response to signal S2 from control unit 2. Thus, lamp 211 is turned on and off. While power storage device 4 is being charged, control unit 2 generates signal S2 for turning on lamp 211 and outputs the signal to drive device 221.

Figure 5:
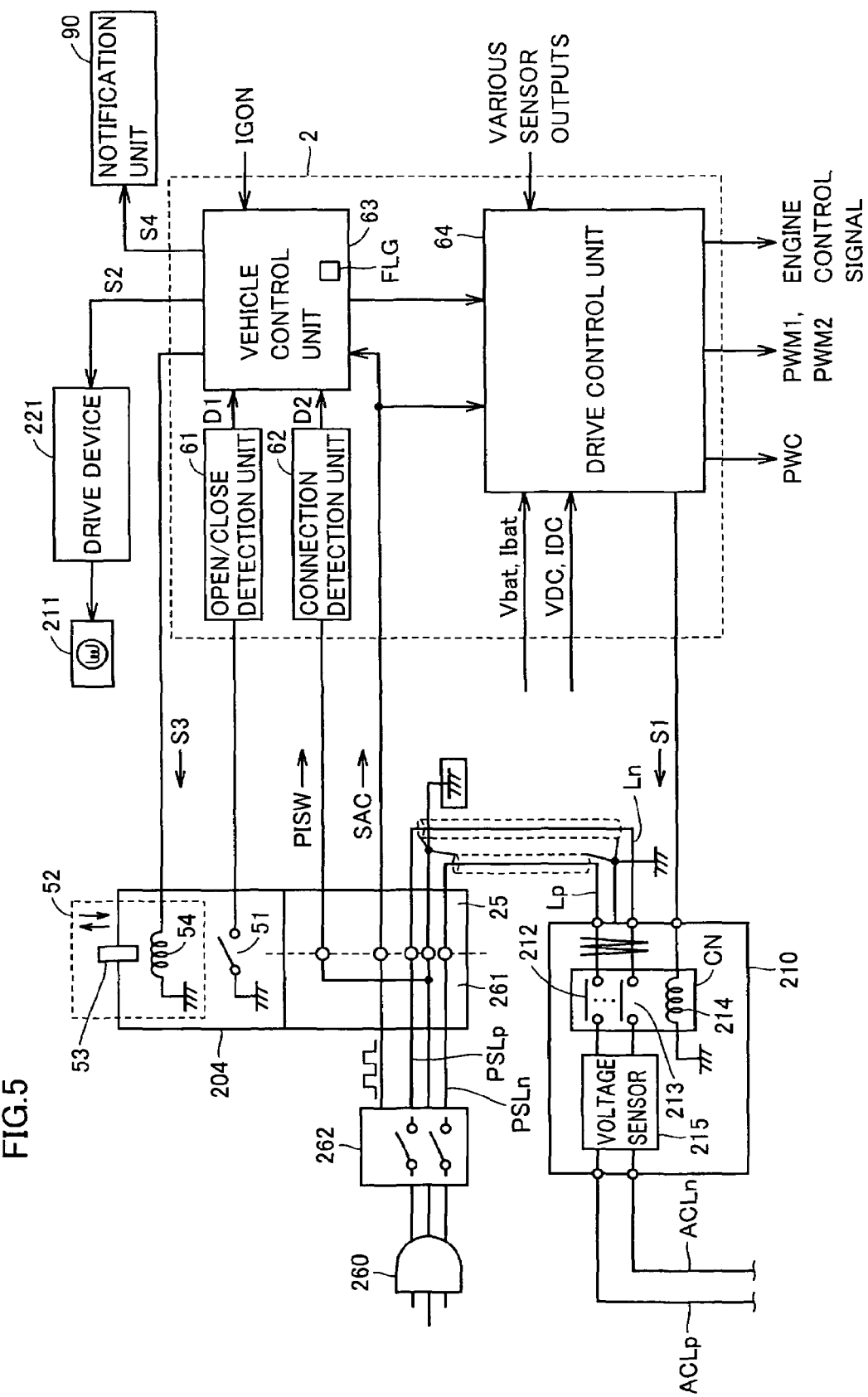
FIG. 5 is a block diagram showing a configuration of a control unit 2 and its peripheral configuration.

FIG. 5 is a block diagram showing a configuration of control unit 2 and its peripheral configuration. Referring to FIG. 5, control unit 2 includes an open/close detection unit 61, a connection detection unit 62, a vehicle control unit 63, and a drive control unit 64.

Open/close detection unit 61 detects whether or not lid 204 is open, and outputs the result of detection D1 to vehicle control unit 63. Open/close detection unit 61 detects whether switch 51 is turned on or not to detect whether lid 204 is closed or lid 204 is opened. Switch 51 is turned on when lid 204 is closed while turned off when lid 204 is opened. When switch 51 is turned on, a predetermined voltage (ground voltage in the configuration shown in FIG. 5) is supplied to open/close detection unit 61. When switch 51 is turned off, electrical connection between open/close detection unit 61 and the ground node is opened. Thus, open/close detection unit 61 can detect that switch 51 is being ON.

Connection detection unit 62 receives signal PISW and detects whether or not plug 261 and charge connector 25 are connected to each other, based on the voltage of signal PISW. Connection detection unit 62 outputs the result of detection D2 to vehicle control unit 63. When plug 261 is connected to charge connector 25 as shown in FIG. 5, the voltage of the signal line for transmitting signal PISW becomes the ground voltage. Namely, the voltage of signal PISW becomes the ground voltage. In contrast, when plug 261 is not connected to charge connector 25, the signal line is electrically opened. Accordingly, whether or not plug 261 and charge connector 25 are connected to each other can be detected based on the voltage of signal PISW.

Vehicle control unit 63 receives detection result D1 of open/close detection unit 61 and detection result D2 of connection detection unit 62, and accordingly controls the state of vehicle 100. The state of vehicle 100 switches between the state where the vehicle is enabled to travel (hereinafter "travel-enabled state") (Ready ON) and the state where the vehicle is disabled from traveling (hereinafter "travel-disabled state") (Ready OFF). While the power storage device is being charged, vehicle control unit 63 controls vehicle 100 such that the vehicle is in the travel-disabled state.

Charging control device 262 outputs signal SAC indicating information (voltage value, current capacity for example) about external power supply 240. When ground leakage occurs (electric power lines PSLp and PSLn are short-circuited for example), charging control device 262 blocks the electric power supply from external power supply 240 to vehicle 100.

Vehicle control unit 63 receives signal SAC from charging control device 262. Based on detection result D2 of connection detection unit 62 and the information about external power supply 240 indicated by signal SAC, vehicle control unit 63 determines whether or not signal PISW is normal.

When signal PISW is abnormal, vehicle control unit 63 sets flag FLG ON that is internally stored. When flag FLG is in the ON state, vehicle control unit 63 sends an instruction (signal S4) for informing the user of the fact that signal PISW is abnormal (namely the fact that an abnormality occurs to detection result D2 of connection detection unit 62), to a notification unit 90. Receiving this instruction (signal S4), notification unit 90 gives notification to the user by a predetermined method.

The method for giving notification by notification unit 90 is not limited to a particular one. Notification unit 90 may be a device turning on an indicator lamp indicating the abnormality of signal PISW, or a device giving notification to the user by generating sound.

Vehicle control unit 63 further sends signal S2 to drive device 221 while the power storage device is being charged. Drive device 221 turns on lamp 211 in response to signal S2.

Vehicle control unit 63 further controls lock 52. Lock 52 includes a deadbolt 53 and a solenoid 54.

Vehicle control unit 63 sends signal S3 to solenoid 54. When signal S3 has H (logical high) level, electric current flows through solenoid 54 so that electromagnetic force is generated. The electromagnetic force causes deadbolt 53 to approach solenoid 54. Accordingly, lid 204 is unlocked.

In contrast, when signal S3 changes from the H level to L (logical low) level, no electromagnetic force is generated because electric current does not flow through solenoid 54. In this case, deadbolt 53 returns to its original position. Thus, lid 204 is locked. Means for returning deadbolt 53 to its original position is not limited to a particular one, and a spring for example may be used.

Lock 52 may be any as long as the lock causes lid 204 to be locked or unlocked according to control by vehicle control unit 63. Therefore, the structure of lock 52 is not limited to the one as shown in FIG. 5.

According to respective outputs of various sensors (such as a sensor detecting the accelerator pedal position for example), voltages Vbat, VDC and currents Ibat, IDC, drive control unit 64 generates switching commands PWC, PWM1, PWM2, and generates an engine control signal for controlling the speed for example of internal combustion engine ENG. Further, when the power storage device is charged, drive control unit 64 sends signal S1 to AC port 210.

AC port 210 includes a connecting portion CN for connecting electric power lines ACLp, ACLn to electric power lines Lp, Ln respectively. Connecting portion CN includes relays 212, 213, and a solenoid 214 for driving relays 212, 213. Relay 212 in its closed state connects electric power line ACLp and electric power line Lp. Relay 213 in its closed state connects electric power line ACLn and electric power line Ln.

AC port 210 further includes a voltage sensor 215. Voltage sensor 215 detects the voltage between electric power lines ACLp and ACLn. The result of the detection by voltage sensor 215 is sent for example to vehicle control unit 63. Accordingly, any failure of connecting portion CN (an abnormality that relay 212 and/or relay 213 does not operate for example) can be detected.

When the power storage device is charged, drive control unit 64 generates switching commands PWC, PWM1, PWM2 based on information (such as voltage, current capacity and the like) of external power supply 240 that is indicated by signal SAC, voltages Vbat, VDC and currents Ibat, IDC.

A process performed by vehicle control unit 63 will be described in detail below. Based on detection result D2 of connection detection unit 62 and the information about external power supply 240 indicated by signal SAC, vehicle control unit 63 determines whether signal PISW is normal or abnormal.

When signal PISW is normal, signal PISW includes correct information about the connection between plug 261 and charge connector 25. Therefore, detection result D2 of connection detection unit 62 is also correct. Based on detection result D2 of connection detection unit 62, vehicle control unit 63 determines whether or not plug 261 and charge connector 25 are connected to each other.

When plug 261 and charge connector 25 are not connected to each other, vehicle control unit 63 determines whether lid 204 is opened or closed, based on detection result D1 of open/close detection unit 61. When lid 204 is closed, vehicle control unit 63 controls the state of vehicle 100 such that the vehicle is in the travel-enabled state (Ready ON).

Specifically, upon receiving activation instruction IGON, vehicle control unit 63 sends the instruction to activate vehicle 100 to drive control unit 64. Receiving this instruction, drive control unit 64 outputs at least one of switching commands PWC, PWM1, PWM2 and outputs the engine control signal to internal combustion engine ENG. Accordingly, the vehicle is activated and the vehicle is caused to travel when the driver steps on the accelerator pedal. In other words, the travel-enabled state refers to the state where vehicle 100 is activated in response to activation instruction IGON.

When plug 261 and charge connector 25 are connected to each other, the problem of damage or the like to the charge cable occurs if vehicle 100 is allowed to travel. Therefore, in this case, vehicle control unit 63 controls vehicle 100 such that the vehicle is in the travel-disabled state (Ready OFF).

Specifically, even if vehicle control unit 63 receives activation instruction IGON, vehicle control unit 63 does not give any instruction for starting the engine and motor generators MG1, MG2 to drive control unit 64. Therefore, drive control unit 64 does not output switching commands PWC, PWM1, PWM2 and the engine control signal. Thus, internal combustion engine ENG and motor generators MG1, MG2 do not operate and accordingly vehicle 100 is not activated.

Further, when plug 261 and charge connector 25 are not connected to each other and lid 204 is opened, vehicle control unit 63 controls vehicle 100 such that vehicle 100 is in the travel-disabled state. In this case, preferably notification unit 90 informs the user of the fact that lid 204 is opened, according to instruction of vehicle control unit 63.

The above-described process is a process performed by vehicle control unit 63 when signal PISW is normal. In contrast, the case where signal PISW is abnormal occurs under the following conditions.

It is supposed for example that the two terminals of charge connector 25 are short-circuited due to foreign matters or the like. When one of the two terminals is the terminal connected to the signal line of signal PISW and the other is the grounded terminal, the voltage of signal PISW is the ground voltage. Namely, signal PISW indicates that plug 261 and charge connector 25 are connected to each other. Actually, however, plug 261 and charge connector 25 are not connected to each other, and thus vehicle control unit 63 does not receive signal SAC. In this case, therefore, vehicle control unit 63 determines that signal PISW is abnormal.

In the case where signal PISW is abnormal, vehicle control unit 63 cannot make correct determination about detection result D2 even if vehicle control unit 63 receives from connection detection unit 62 the detection result concerning whether plug 261 and charge connector 25 are connected to each other. In such a case, vehicle control unit 63 may control the state of vehicle 100 such that the vehicle is in the travel-disabled state.

In the case where vehicle 100 is unable to travel in spite of the fact that plug 261 is not connected to charge connector 25, the user could suffer from inconvenience. For example, it is supposed that the user tries to move vehicle 100 to an auto-repair garage located near the position where vehicle 100 is parked. Vehicle 100, however, is disabled from traveling. Therefore, the user has to expend extra efforts for moving vehicle 100.

In particular, in the case of the hybrid vehicle, the hybrid vehicle can travel using the internal combustion engine and the electric motor. In the above-described case, however, vehicle 100 is unable to travel in spite of the fact that the internal combustion engine and the electric motor are both operable. As a result, the user could suffer from inconvenience.

In the present embodiment, when signal PISW is abnormal, vehicle control unit 63 determines whether lid 204 is closed or not based on detection result D1 of open/close detection unit 61. When lid 204 is closed, plug 261 can be regarded as not being connected to charge connector 25. Therefore, when lid 204 is closed, vehicle control unit 63 controls the state of vehicle 100 such that the vehicle is in the travel-enabled state. In this way, vehicle 100 can travel in limp-home mode (in which the necessary minimum capabilities for the vehicle to travel are ensured).

Figure 6:
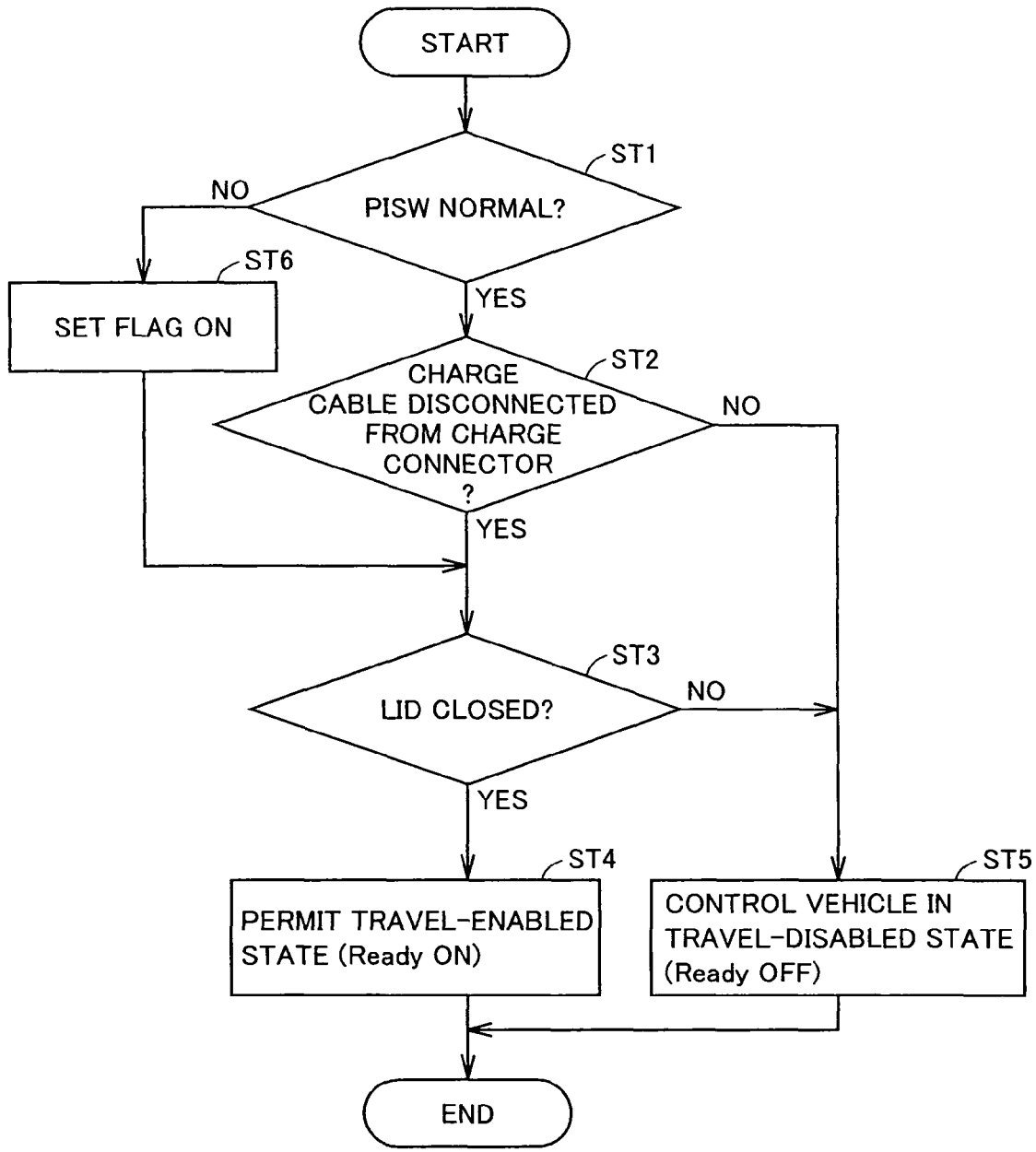
FIG. 6 is a flowchart illustrating a process for controlling a vehicle state that is performed by a vehicle control unit 63.

FIG. 6 is a flowchart illustrating a process for controlling the vehicle state, as performed by vehicle control unit 63. The process illustrated by this flowchart is called from a main routine and executed at certain time intervals or when a predetermined condition is satisfied.

Referring to FIGS. 6 and 5, vehicle control unit 63 determines whether signal PISW is normal or not (step ST1). Specifically, based on signal PISW, connection detection unit 62 detects whether or not plug 261 is connected to charge connector 25, and outputs its detection result D2 to vehicle control unit 63. Vehicle control unit 63 receives detection result D2 of connection detection unit 62 and receives signal SAC. Based on information (such as voltage value and current capacity) of external power supply 240 that is indicated by signal SAC and detection result D2 of connection detection unit 62, vehicle control unit 63 determines whether signal PISW is normal or not.

For example, in the case where the voltage value indicated by signal SAC is AC 100 V and connection detection unit 62 detects that plug 261 is connected to charge connector 25, vehicle control unit 63 determines that signal PISW is normal. In contrast, in the case where the voltage value indicated by signal SAC is AC 100 V while connection detection unit 62 detects that plug 261 is not connected to charge connector 25, vehicle control unit 63 determines that signal PISW is abnormal. Further, when connection detection unit 62 detects that plug 261 is connected to charge connector 25, regardless of the fact that signal SAC is not sent to vehicle control unit 63, vehicle control unit 63 determines that signal PISW is abnormal.

When signal PISW is normal (YES in step ST1), vehicle control unit 63 determines, based on detection result D2 of connection detection unit 62, whether or not the charge cable (plug 261) is disconnected from charge connector 25 (step ST2). When the charge cable (plug 261) is disconnected from charge connector 25 (YES in step ST2), vehicle control unit 63 determines, based on detection result D1 of open/close detection unit 61, whether lid 204 is closed or not (step ST3).

When lid 204 is closed (YES in step ST3), vehicle control unit 63 permits the state of vehicle 100 to be the travel-enabled state (Ready ON) (step ST4). Further, vehicle control unit 63 controls vehicle 100 such that vehicle 100 is in the travel-enabled state.

When lid 204 is opened (NO in step ST3), vehicle control unit 63 controls vehicle 100 such that the vehicle is in the travel-disabled state (Ready OFF) (step ST5). When the process in step ST4 or process in step ST5 is completed, the entire process comes to an end.

When it is determined in step ST2 that the charge cable (plug 261) is not disconnected from (namely the charge cable is connected to) charge connector 25 (NO in step ST2), the process of step ST5 is performed. When the charge cable (plug 261) is connected to charge connector 25, a problem of damage or the like to the charge cable could occur if vehicle 100 is allowed to travel. Therefore, in this case, vehicle control unit 63 controls vehicle 100 such that the vehicle is in the travel-disabled state (step ST5).

When it is determined in step ST1 that signal PISW is abnormal (NO in step ST1), vehicle control unit 63 cannot correctly determine whether or not the charge cable (plug 261) is connected to charge connector 25. Therefore, in this case, vehicle control unit 63 sets flag FLG ON (step ST6). Further, vehicle control unit 63 determines, based on detection result D1 of open/close detection unit 61, whether lid 204 is closed or not (step ST3).

When lid 204 is closed (YES in step ST3), there is a high possibility that the charge cable is not connected to charge connector 25. Accordingly, vehicle control unit 63 permits the state of vehicle 100 to be the travel-enabled state (Ready ON) (step ST4). In contrast, when lid 204 is opened (NO in step ST3), there is a possibility that the charge cable is connected to charge connector 25. Accordingly, vehicle control unit 63 controls the state of vehicle 100 such that the vehicle is in the travel-disabled state (step ST5).

Figure 7:
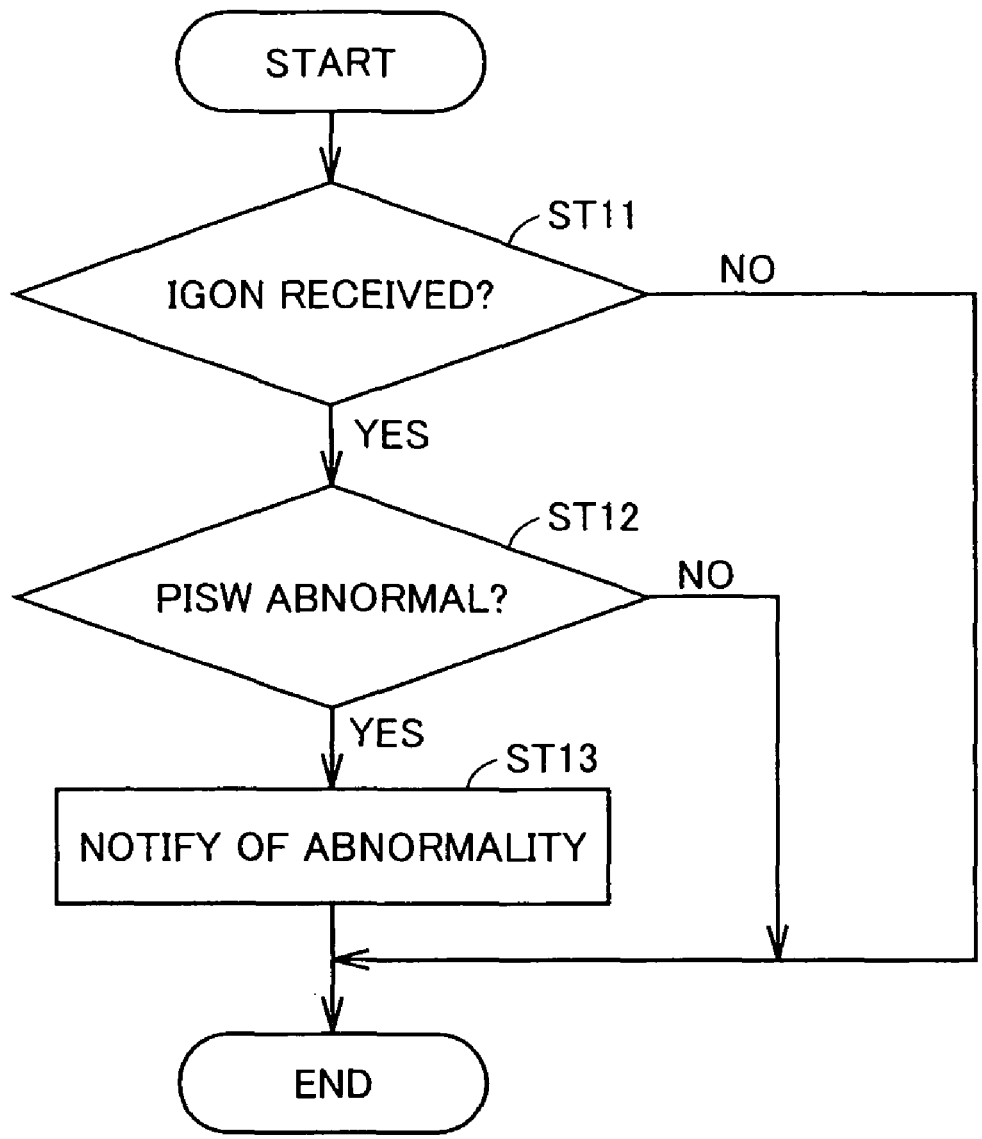
FIG. 7 is a flowchart illustrating a process for giving notification by vehicle control unit 63 and a notification unit 90.

FIG. 7 is a flowchart illustrating a notification process performed by vehicle control unit 63 and notification unit 90. The process shown in this flowchart is called from the main routine and executed at certain time intervals or when a predetermined condition is satisfied.

Referring to FIGS. 7 and 5, vehicle control unit 63 determines whether or not it receives activation instruction IGON (step ST11). When vehicle control unit 63 does not receive activation instruction IGON (NO in step ST11), the entire process comes to an end. When vehicle control unit 63 receives activation instruction IGON (YES in step ST11), the process proceeds to step ST12.

In step ST12, vehicle control unit 63 determines whether signal PISW is abnormal or not. When vehicle control unit 63 determines that signal PISW is abnormal, vehicle control unit 63 sets flag FLG ON in step ST6 of FIG. 6. Thus, in step ST12, vehicle control unit 63 determines whether flag FLG is set ON or not and accordingly determines whether signal PISW is abnormal or not.

When signal PISW is abnormal (YES in step ST12), vehicle control unit 63 sends to notification unit 90 an instruction (signal S4) for informing the user of the fact that signal PISW is abnormal (namely the detection result of connection detection unit 62 is abnormal). Receiving this instruction (signal S4), notification unit 90 performs a notification process (step ST13). Thus, when the user activates vehicle 100, the user can become aware of the abnormality. When the process of step ST13 is completed, the entire process comes to an end.

When signal PISW is normal (NO in step ST12), the notification process by vehicle control unit 63 and notification unit 90 is not performed. In this case as well, the entire process comes to an end.

Thus, in accordance with the first embodiment, when abnormality of signal PISW occurs, vehicle control unit 63 determines whether lid 204 is closed or not. When lid 204 is closed, vehicle control unit 63 controls vehicle 100 such that the vehicle is in the travel-enabled state. Thus, vehicle 100 can travel in limp-home mode, and the influence on the convenience of the user can be lessened.

Second Embodiment

A vehicle in a second embodiment has a configuration similar to the configuration shown in FIGS. 1 to 3. Further, a control unit included in the vehicle in the second embodiment has a configuration similar to the configuration of control unit 2 shown in FIG. 5. Therefore, the vehicle in the second embodiment will be described with reference to FIG. 5 for example as appropriate.

The vehicle in the second embodiment locks lid 204 when abnormality of signal PISW is detected. Thus, it can be prevented more reliably that the vehicle travels while the charge cable is still connected to the charge connector.

Figure 8:
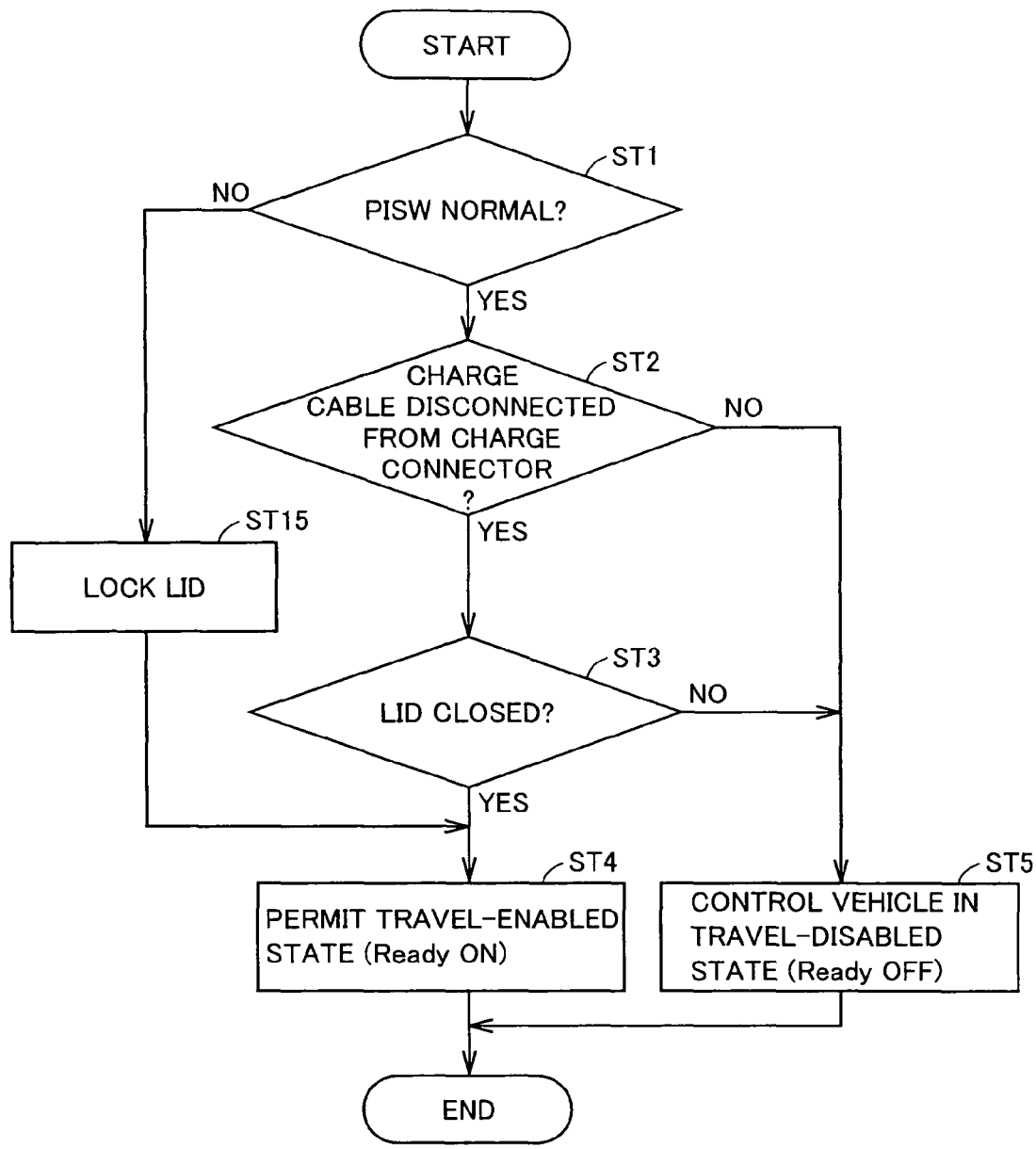
FIG. 8 is a flowchart illustrating a process for controlling a vehicle state according to a second embodiment.

FIG. 8 is a flowchart illustrating a process for controlling the vehicle state in the second embodiment. The process shown in this flowchart is called from the main routine and executed at certain time intervals or when a predetermined condition is satisfied.

Referring to FIGS. 8 and 6, the process of the flowchart shown in FIG. 8 is different from that of the flowchart shown in FIG. 6 in that the process of step ST15 is performed instead of the process of step ST6.

Referring to FIGS. 8 and 5, when vehicle control unit 63 determines that signal PISW is abnormal (NO in step ST1), vehicle control unit 63 locks lid 204 (step ST15). More specifically, in step ST15, vehicle control unit 63 sends signal S3 of L level to solenoid 54. Accordingly, lid 204 is locked. Then, vehicle control unit 63 permits the state of vehicle 100 to become the travel-enabled state (step ST4). Here, respective processes in other steps of the flowchart shown in FIG. 8 are similar to those in corresponding steps of the flowchart shown in FIG. 6, and thus the further description of the processes will not be repeated.

In step ST15, lid 204 is closed and locked. Accordingly, the user cannot connect plug 261 to charge connector 25. Therefore, in accordance with the second embodiment, it can more reliably be prevented that the vehicle travels while the charge cable is still connected to charge connector 25.

Further, in accordance with the second embodiment, vehicle 100 can travel in limp-home mode when signal PISW is abnormal, as in the first embodiment.

Third Embodiment

Figure 9:
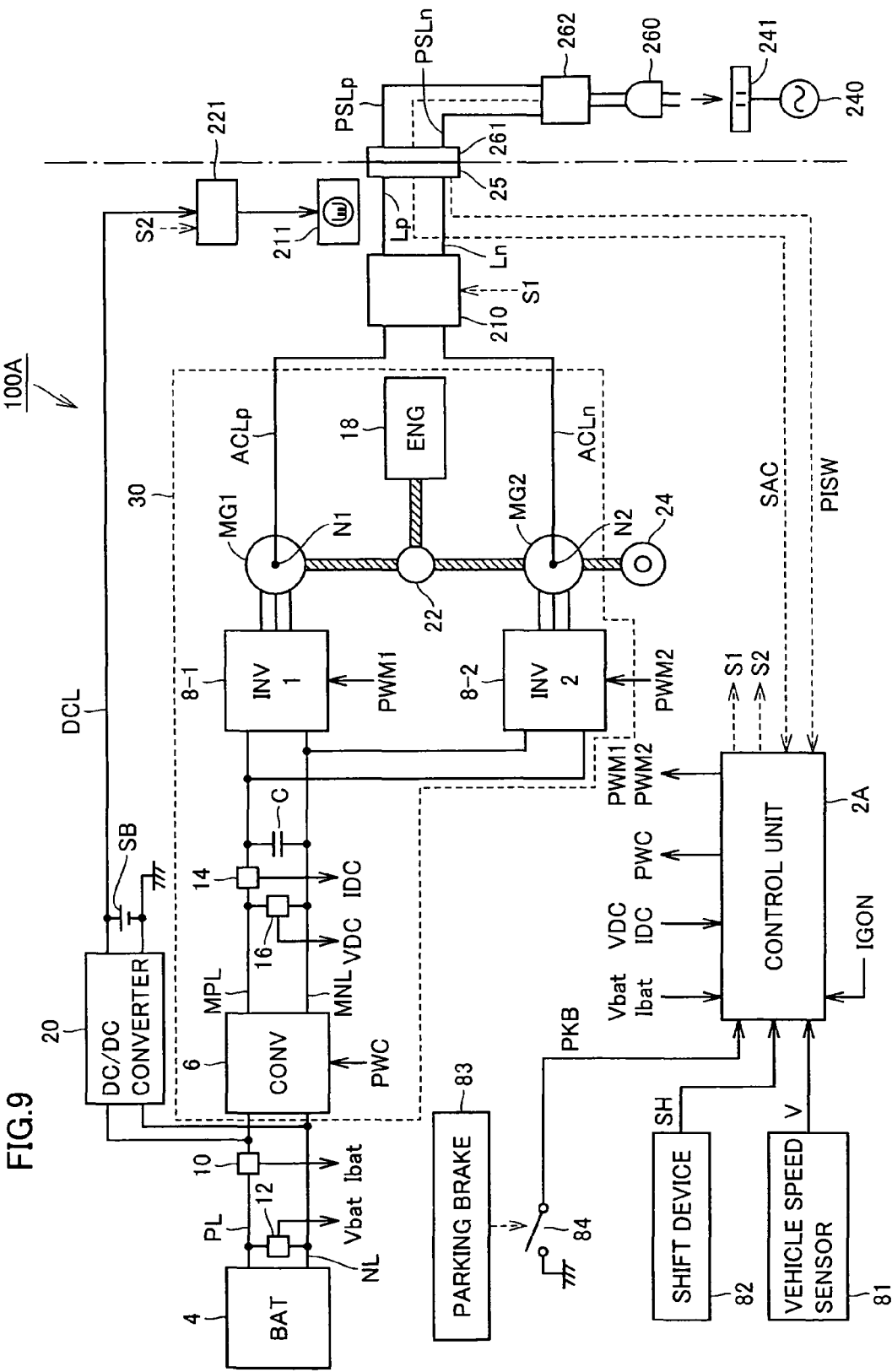
FIG. 9 is a schematic configuration diagram of a vehicle according to a third embodiment.

FIG. 9 is a schematic configuration diagram of a vehicle in a third embodiment. Referring to FIGS. 9 and 3, vehicle 100A differs from vehicle 100 in that the former additionally includes a vehicle speed sensor 81, a shift device 82, a parking brake 83, and a switch 84 for detecting that parking brake 83 is applied. Moreover, vehicle 100A differs from vehicle 100 in that the former includes a control unit 2A instead of control unit 2. Other components of vehicle 100A are similar to those of vehicle 100, and the further description of these components will not be repeated.

Vehicle speed sensor 81 detects the speed of vehicle 100A and outputs signal V indicating the speed to control unit 2A. According to driver's shift operation, shift device 82 selects a shift position corresponding to the driver's shift operation, from a plurality of shift positions. Shift device 82 outputs signal SH indicating the selected shift position to control unit 2A. A plurality of shift positions include, for example, parking position (P position), reverse position (R position), neutral position (N position), and drive position (D position).

Switch 84 is turned on when parking brake 83 is applied. Switch 84 is turned on to output signal PKB to control unit 2A.

Similarly to vehicle 100, vehicle 100A has charge port 200 provided in a side surface (see FIG. 1). Charge port 200 is structured similarly to the one shown in FIG. 2.

Figure 10:
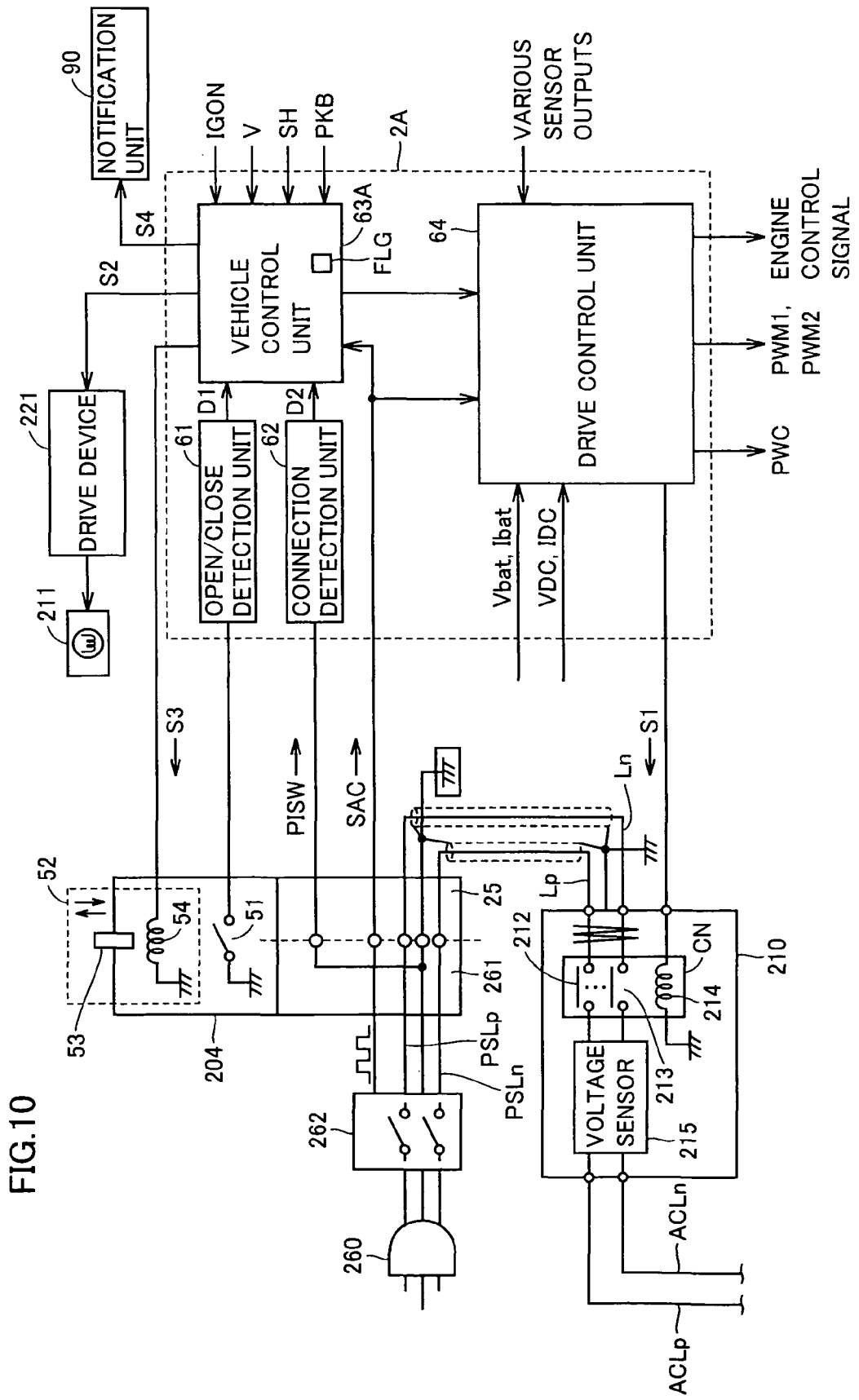
FIG. 10 is a diagram illustrating a configuration of a control unit 2A.

FIG. 10 illustrates a configuration of control unit 2A. Referring to FIGS. 10 and 5, control unit 2A differs from control unit 2 in that the former includes a vehicle control unit 63A instead of vehicle control unit 63.

Vehicle control unit 63A determines, based on detection result D2 of connection detection unit 62, whether or not plug 261 is connected to charge connector 25. It should be noted that, as described above, in the case where the terminal connected to the signal line for transmitting signal PISW is short-circuited to the ground due to foreign matters or the like, the voltage of signal PISW is the ground voltage in spite of the fact that plug 261 is not connected to charge connector 25. Namely, signal PISW is abnormal.

Vehicle control unit 63A determines, based on signal V indicating the vehicle speed, signal SH indicating the shift position selected by shift device 82 and signal PKB indicating that parking brake 83 is applied, whether or not a predetermined condition based on which it can be presumed that vehicle 100A is being stopped is satisfied. When the condition is satisfied, vehicle control unit 63A controls vehicle 100A such that the vehicle is in the travel-disabled state. When the condition is not satisfied, vehicle control unit 63A keeps vehicle 100A in the travel-enabled state.

FIG. 11 is a flowchart illustrating a process for controlling the state of vehicle 100A that is performed by vehicle control unit 63A. The process shown in the flowchart is called from the main routine and executed at certain time intervals or when a predetermined condition is satisfied.

Referring to FIGS. 11 and 10, vehicle control unit 63A determines, based on detection result D2 of connection detection unit 62, whether or not connection detection unit 62 detects the connection between the charge cable (plug 261) and charge connector 25 (step ST21). When the voltage of signal PISW is the ground voltage, connection detection unit 62 outputs to vehicle control unit 63A detection result D2 indicating that the charge cable (plug 261) and charge connector 25 are connected to each other. In this case (YES in step ST21), vehicle control unit 63A performs the process in step ST22. When connection detection unit 62 does not detect the connection between the charge cable (plug 261) and charge connector 25 (NO in step ST21), the entire process comes to an end. In this case, the state of vehicle 100A is kept in the state before the process of the flowchart shown in FIG. 11 is performed.

In step ST22, vehicle control unit 63A determines, based on signal V, whether the vehicle speed is zero or not. When the vehicle speed is zero (YES in step ST22), vehicle control unit 63A controls vehicle 100A such that the vehicle is in the travel-disabled state (step ST26). The fact that the vehicle speed is zero means that vehicle 100A is being stopped. Therefore, vehicle control unit 63A controls vehicle 100A such that the vehicle is in the travel-disabled state.

When the vehicle speed is not zero, vehicle 100A is actually moving or there is a possibility that vehicle 100A is moving. In this case, vehicle control unit 63A determines whether or not the electric power from the external power supply is fed to vehicle 100A, based on whether or not the vehicle control unit receives signal SAC (step ST23). When the electric power is fed from external power supply 240 to vehicle 100A (YES in step ST23), vehicle control unit 63A controls vehicle 100A in the travel-disabled state (step ST26). The fact that vehicle control unit 63A receives signal SAC means that plug 261 is connected to charge connector 25. Accordingly, in this case, vehicle control unit 63A controls vehicle 100A such that the vehicle is in the travel-disabled state. Thus, vehicle 100A can be prevented from traveling with the charge cable still connected to charge connector 25.

When vehicle control unit 63A does not receive signal SAC, namely the electric power is not fed from external power supply 240 to vehicle 100A (NO in step ST23), vehicle control unit 63A determines, based on signal SH, whether the shift position is the P position or not (step ST24). When the shift position is the P position (YES in step ST24), vehicle control unit 63A controls vehicle 100A such that the vehicle is in the travel-disabled state (step ST26). When the shift position is the P position, there is a high possibility that vehicle 100A is being stopped. Therefore, vehicle control unit 63A controls vehicle 100A such that the vehicle is in the travel-disabled state.

When the shift position is any except for the P position (NO in step ST24), vehicle control unit 63A determines whether the parking brake is applied or not (step ST25). When vehicle control unit 63A receives signal PKB, vehicle control unit 63A determines that the parking brake is applied. In this case (YES in step ST25), vehicle control unit 63A controls vehicle 100A in the travel-disabled state (step ST26). As the parking brake is applied, there is a higher possibility that vehicle 100A is being stopped. Therefore, vehicle control unit 63A controls vehicle 100A such that the vehicle is in the travel-disabled state.

When vehicle control unit 63A does not receive signal PKB, vehicle control unit 63A determines that the parking brake is being released. In this case, vehicle control unit 63A keeps the travel-enabled state of vehicle 100A (step ST27).

When the process in step ST26 or step ST27 is completed, the entire process comes to an end.

There appears to be a low possibility that the user connects the charge cable to the charge connector while the vehicle is moving. Therefore, in the third embodiment, vehicle 100A is controlled to be in the travel-disabled state when a predetermined condition, based on which it can be presumed that the vehicle is being stopped, is satisfied, and vehicle 100A is kept in the travel-enabled state when the condition is not satisfied.

In particular, some vehicles could be caused to creep. There appears to be a low possibility that the user of such a vehicle gets out of the vehicle for charging the vehicle without performing any operation for keeping the vehicle stopped. Therefore, in the third embodiment, vehicle control unit 63A controls vehicle 100A such that the vehicle is in the travel-disabled state when a predetermined condition, based on which it can be presumed that the vehicle is being stopped, is satisfied. The predetermined condition is at least one of the condition that the vehicle speed is zero, the condition that the electric power is fed from external power supply 240 to vehicle 100A (vehicle control unit 63A receives signal SAC from charging control device 262), the condition that the shift position is the P position, and the condition that the parking brake is applied, as shown in FIG. 11.

In accordance with the third embodiment, when vehicle control unit 63A determines that the driver performs an operation for parking the vehicle, the vehicle control unit controls the vehicle such that the vehicle is in the travel-disabled state, and accordingly, user's unexpected behavior of the vehicle can be prevented from occurring.

Here, FIGS. 3 and 9 show, as an example of the hybrid vehicle chargeable by an external power supply, a series/parallel hybrid system in which the power split device can split the motive power of the engine into the one to be transmitted to the axle and the other to be transmitted to the electric generator. It should be noted that the present invention is also applicable to a parallel hybrid vehicle and a series hybrid vehicle.

Further, the configuration for charging power storage device 4 with electric power from an external power source is not limited to the configurations in FIGS. 3 and 9. For example, in the case where AC electric power such as the one from a commercial power supply is used to charge power storage device 4, a rectifying device and an inverter for example for converting the AC power into DC power may be provided outside the vehicle. In this case, the DC power is supplied to the vehicle from the outside of the vehicle, so that the power storage device can be charged directly.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric-powered vehicle chargeable by an external power supply, comprising:
 a power storage device storing electric power used for generating driving force for said electric-powered vehicle;

a charge connector used for connecting, to said electric-powered vehicle, a cable transmitting electric power from said external power supply to charge said power storage device;

a lid configured to be opened and closed, and cover said charge connector when said lid is in a closed state;

a first detection unit detecting whether or not said charge connector and said cable are connected to each other;

a second detection unit detecting whether said lid is in the closed state or an opened state; and a vehicle control unit controlling said electric-powered vehicle into a travel-enabled state when said first detection unit detects that said charge connector and said cable are disconnected from each other and said second detection unit detects the closed state of said lid, wherein in a case where result of detection by said first detection unit is abnormal, said vehicle control unit controls said electric-powered vehicle into said travel-enabled state when said second detection unit detects the closed state of said lid, and said vehicle control unit controls said electric-powered vehicle into a travel-disabled state in a case where said result of detection by said first detection unit is normal, where said first detection unit detects that said charge connector and said cable are connected to each other and where said second detection unit detects the opened state of said lid.

2. The electric-powered vehicle according to claim 1, further comprising a notification unit giving notification that said result of detection by said first detection unit is abnormal, in response to a notification instruction from said vehicle control unit.

3. The electric-powered vehicle according to claim 2, wherein said vehicle control unit sends said notification instruction to said notification unit in response to an instruction to activate said vehicle, in the case where said result of detection by said first detection unit is abnormal.

4. An electric-powered vehicle chargeable by an external power supply, comprising:

a power storage device storing electric power used for generating driving force for said electric-powered vehicle;

a charge connector used for connecting, to said electric-powered vehicle, a cable transmitting electric power from said external power supply to charge said power storage device;

a lid configured to be opened and closed, and cover said charge connector when said lid is in a closed state;

a first detection unit detecting whether or not said charge connector and said cable are connected to each other;

a second detection unit detecting whether said lid is in the closed state or an opened state; and a vehicle control unit controlling said electric-powered vehicle into a travel-enabled state when said first detection unit detects that said charge connector and said cable are disconnected from each other and said second detection unit detects the closed state of said lid, wherein in a case where result of detection by said first detection unit is abnormal, said vehicle control unit controls said electric-powered vehicle into said travel-enabled state when said second detection unit detects the closed state of said lid, and said vehicle control unit controls said electric-powered vehicle into a travel-disabled state in the case where said result of detection by said first detection unit is abnormal and said second detection unit detects the opened state of said lid.

5. The electric-powered vehicle according to claim 4, further comprising a notification unit giving notification that said result of detection by said first detection unit is abnormal, in response to a notification instruction from said vehicle control unit.

6. The electric-powered vehicle according to claim 5, wherein said vehicle control unit sends said notification instruction to said notification unit in response to an instruction to activate said vehicle, in the case where said result of detection by said first detection unit is abnormal.

7. An electric-powered vehicle chargeable by an external power supply, comprising:

a power storage device storing electric power used for generating driving force for said electric-powered vehicle;

a charge connector used for connecting, to said electric-powered vehicle, a cable transmitting electric power from said external power supply to charge said power storage device;

a lid configured to be opened and closed, and cover said charge connector when said lid is in a closed state;

a closed state keeping unit keeping said lid in the closed state;

a first detection unit detecting whether or not said charge connector and said cable are connected to each other;

a second detection unit detecting whether said lid is in the closed state or an opened state; and a vehicle control unit controlling said electric-powered vehicle into a travel-enabled state when said first detection unit detects that said charge connector and said cable are disconnected from each other and said closed state keeping unit keeps said lid in the closed state, wherein in a case where result of detection by said first detection unit is abnormal, said vehicle control unit controls said electric-powered vehicle into said travel-enabled state when said closed state keeping unit keeps said lid in the closed state, and said vehicle control unit controls said electric-powered vehicle into a travel-disabled state in a case where said result of detection by said first detection unit is normal, where said first detection unit detects that said charge connector and said cable are connected to each other and where said second detection unit detects the opened state of said lid.

8. The electric-powered vehicle according to claim 7, wherein said vehicle control unit controls said electric-powered vehicle into said travel-disabled state in the case where said result of detection by said first detection unit is abnormal and said second detection unit detects the opened state of said lid.

* * * * *